2,797,706

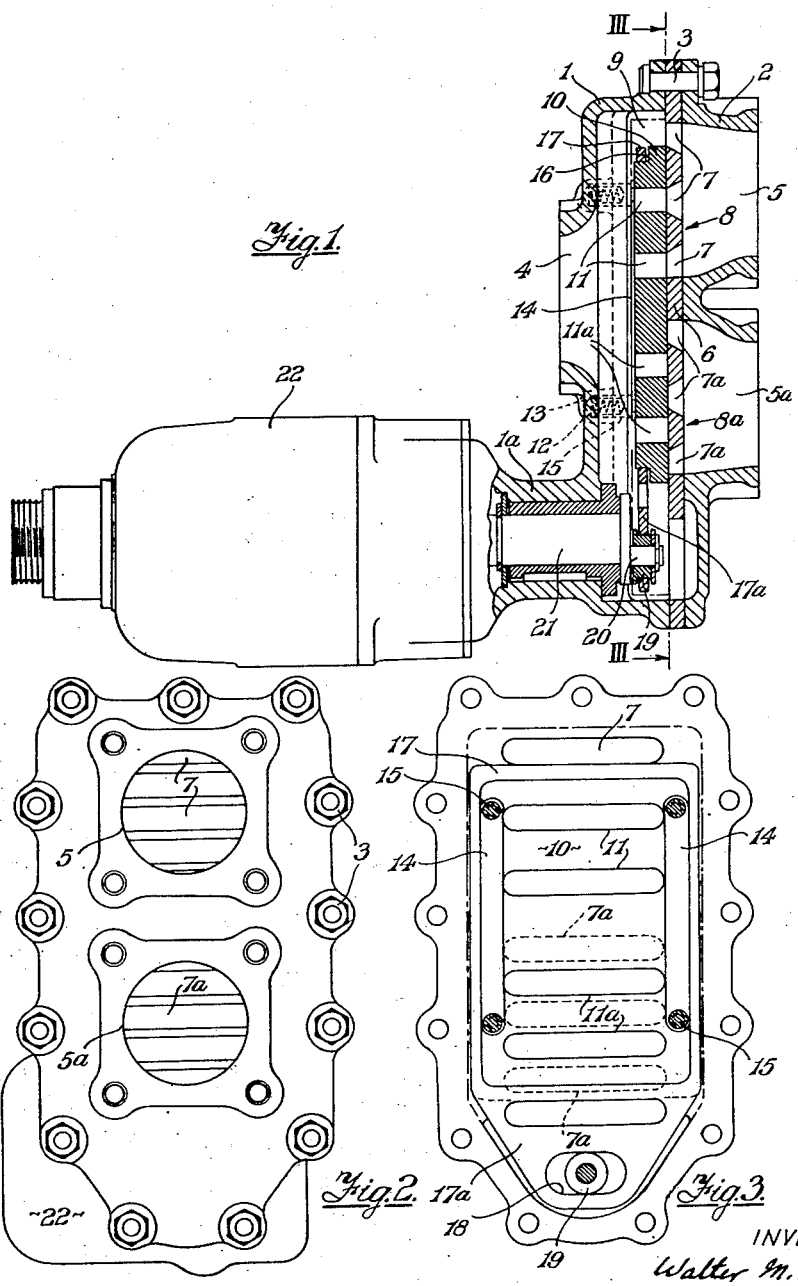

FLUID FLOW CONTROL VALVES

Walter Mostyn Harrison, Cefn Coed, near Merthyr Tydfil, South Wales, assignor to Teddington Aircraft Controls Limited, Cefn Coed, Wales Application March 1, 1952, Serial No. 274,410

Claims priority, application Great Britain March 20, 1951

2 Claims. (Cl. 137—625.48)

This invention relates to fluid flow control valves and has for its main object the provision of a simple but efficient form of gate valve for providing selective and proportionate flow of air or other gas from a conduit or chamber to two separate conduits or outlets.

It is also an object of the invention to provide a valve for the purpose mentioned which will function efficiently when operating with air or other gases at relatively high temperatures and pressures.

According to the invention the new or improved valve comprises a housing embodying at one side an inlet port or passage and at another side a pair of side by side outlet ports or passages, a fixed metal grid structure extending across each outlet port, and a single grid-like gate member which is formed of carbon or other self-lubricating material and which slides upon and co-operates with the fixed grids to regulate flow of fluid, e. g. gas through the outlet ports, the relative disposition of the slots in the gate member and the slots in the fixed grids being such that in one limit position of the gate one outlet port is completely closed and there is full fluid flow through the other outlet port whilst movement of the gate from said limit position progressively opens the first mentioned outlet port and progressively closes the other.

Preferably, the two fixed grid structures are constituted by a single plate-like member appropriately slotted and rigidly secured within the valve housing across the outlet ports, the gate member being spring-pressed into contact with said plate.

Reference will now be made to the accompanying drawings which illustrate by way of example an embodiment of the invention which has been designed for use in an air conditioning system to regulate a flow of hot air between a cooler circuit and a by-pass around said circuit, but it will be understood that the use of the valve is not limited in this respect. In the drawings Fig. 1 is a sectional elevation through the valve, Fig. 2 is an end view thereof, and Fig. 3 is a sectional end view taken on the line III—III of Fig. 1.

The valve shown comprises two housing sections 1, 2 preferably formed as castings of aluminium or other light metal and adapted to be secured together by bolts 3, the casting 1 embodying an inlet port 4 and the casting 2 two side by side outlet ports 5, 5a. Clamped between the two castings 1, 2 is a metal plate 6 formed with two series of transverse slots 7, 7a to provide fixed grid structures 8, 8a across the outlet ports 5, 5a respectively. The casting 1 is shaped to define a chamber 9 which accommodates a grid-like gate member 10, said gate member being formed of carbon or other self-lubricating material and being supported for vertical sliding movement upon the grid-plate 6. The gate 10 is also provided with two pairs of transverse slots 11, 11a which co-operate with the grids 8, 8a to regulate fluid flow through the ports 5, 5a respectively. By reference to Fig. 1 it will be seen that the arrangement of the slots in the gate member 10 is such that with the gate in the lower limit position, as shown, the gate slots 11 are aligned with the slots 7 of fixed grid 8 to permit substantially full fluid flow through port 5 whilst gate slots 11a are aligned with the bars of fixed grid 8a so shutting off port 5a completely. As the gate is lifted, port 5a is progressively opened and port 5 is progressively closed and thus by adjustment of the gate the gas stream entering port 4 may be divided between the ports 5, 5a in any desired proportions.

To ensure smooth sliding movement of the gate and an effective sealing of a gas flow passage, when the co-operating portion of the gate is in the position to close said passage the gate 10 is guided at its edges by the side walls of the chamber 9 and it is spring loaded by a series of compression springs 12 located in pockets 13 formed in the casting 1 and acting upon strips or runners 14, preferably of stainless steel, said springs serving to press the gate into close engagement with the fixed grids 8, 8a. The springs 12 may be loosely accommodated in the pockets 13 and bear directly upon the runners 14 or, as shown in Fig. 1, the springs may be located in tubular plungers 15 which have a sliding fit in the pockets 13 and are secured at their outer ends to the runners, this arrangement having the advantage that it dispenses with the need of providing any additional means for retaining the runners in position.

At its inlet side, the carbon gate 10 is rebated around its edges as shown at 16 and fits within a frame-like actuating member 17, the latter having an extension 17a which is slotted as at 18 to receive a roller 19 mounted on a crank 20 fast with an operating shaft 21. As shown in Fig. 1, shaft 21 is driven directly by an electric motor 22 mounted upon an extension 1a of casting 1 which also supports the said shaft, but any other form of power means may be employed or the shaft 21 may be hand actuated if desired.

It will be seen that the invention provides a simple and compact form of control valve for regulating the flow of hot air or other gas proportionately between two conduits and which enables such flow to be accurately adjusted with relatively small movement of the gate member, the actual extent of movement of said gate member to cover the full range of adjustment being dependent upon the number and width of the slots in the fixed grid structures and the gates.

I claim:

1. In a fluid flow control valve, housing structure embodying a pair of side by side outlet ports and including also an inlet port, fixed grid structure, means rigidly mounting said grid structure upon said housing to form a partition between the said outlet ports on one side and said inlet port on the opposite side, said partition presenting a series of alternate transverse slots and imperforate portions to said outlet ports, elongated gate structure having alternate transverse slots and imperforate portions, means mounting said gate structure in said housing for rectilinear sliding movement with respect to and against one side surface of said fixed grid structure, the relative positions of the slots in said fixed grid structure and said gate structure being such that in one extreme position of said gate structure imperforate portions of the gate structure completely close the slots presented by said fixed grid structure to one outlet port and slots in the gate structure are in register with the slots presented by said partition to the other outlet port, actuator means connected with said gate structure for moving said structure from its said one extreme position to its other extreme position in which the opening and closing of the slots in said partition, with respect to the two outlet ports, is reversed, said gate having marginal imperforate portions extending in the direction of its sliding movement and disposed at opposite sides of said slots in said gate, runners fixed against movement in the direction of said sliding movement and engaging said marginal imperforate portions of said gate in sliding engagement therewith along the length of said runners, and spring means acting against said runners to uniformly exert a sealing pressure in a direction normal to said sliding movement to urge said gate toward said grid, the runners and spring means being disposed out of the flow of fluid between said ports.

2. In a fluid flow control valve, housing structure having on one side two outlet ports in side by side disposition and on the opposite side an inlet port, fixed grid structure having alternate slots and imperforate portions, means rigidly mounting said grid structure in and upon said housing between the said outlet ports on one side and the said inlet port on the opposite side, with said grid structure presenting alternate slots and imperforate portions to each said outlet port, a single elongated gate part, said gate part having alternate slots and imperforate portions corresponding with the slots and imperforate portions in said grid structure, means resiliently mounting said gate part for rectilinear reciprocatory motion against one side surface of said fixed grid structure, actuator means for producing said movement of said gate part, said actuator means comprising a rotary part having a crank, and means disposed in axial alignment with said gate and located entirely to one side of the flow of fluid between said ports connecting said crank with said gate part, said gate having marginal imperforate portions extending in the direction of its sliding movement and disposed at opposite sides of said slots in said gate, runners fixed against movement in the direction of said sliding movement and engaging said marginal imperforate portions of said gate in sliding engagement therewith along the length of said runners, and spring means acting against said runners to uniformly exert a sealing pressure in a direction normal to said sliding movement to urge said gate toward said grid, the runners and spring means being disposed out of the flow of fluid between said ports.

References Cited in the file of this patent

UNITED STATES PATENTS

| | | |
|---|---|---|
| 402,224 | Blessing | Apr. 30, 1889 |
| 1,010,274 | Leisel | Nov. 28, 1911 |
| 1,172,833 | Ricker | Feb. 22, 1916 |
| 1,192,141 | White | July 25, 1916 |
| 1,567,537 | Mocukus | Dec. 29, 1925 |
| 1,854,918 | Adams | Apr. 19, 1932 |
| 2,465,458 | Jordan | Mar. 29, 1949 |
| 2,503,563 | Ray | Apr. 11, 1950 |
| 2,601,231 | Smith | June 24, 1952 |
| 2,641,871 | Ray | June 16, 1953 |

FOREIGN PATENTS

| | | |
|---|---|---|
| 722,410 | France | Dec. 29, 1931 |